(12) United States Patent
Imai (10) Patent No.: US 11,376,745 B2
(45) Date of Patent: Jul. 5, 2022

(54) CONTROL DEVICE, ROBOT, AND ROBOT SYSTEM

(71) Applicant: Seiko Epson Corporation, Tokyo (JP)

(72) Inventor: Ryosuke Imai, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 232 days.

(21) Appl. No.: 16/420,237

(22) Filed: May 23, 2019

(65) Prior Publication Data

US 2019/0358825 A1 Nov. 28, 2019

(30) Foreign Application Priority Data

May 28, 2018 (JP) .............................. JP2018-101842

(51) Int. Cl.
*B25J 13/08* (2006.01)
*B25J 9/04* (2006.01)
*B25J 9/16* (2006.01)

(52) U.S. Cl.
CPC ............ *B25J 13/088* (2013.01); *B25J 9/043* (2013.01); *B25J 9/1602* (2013.01); *B25J 9/1615* (2013.01); *B25J 9/1651* (2013.01); *B25J 9/1661* (2013.01)

(58) Field of Classification Search
CPC ........ B25J 13/088; B25J 9/043; B25J 9/1661; B25J 9/1615; B25J 9/1651; B25J 9/1602
USPC ....................................................... 700/258
See application file for complete search history.

(56) References Cited

U.S. PATENT DOCUMENTS

| 8,831,781 | B2 * | 9/2014 | Igarashi | B25J 13/088 |
| | | | | 700/258 |
| 9,044,861 | B2 * | 6/2015 | Gomi | B25J 9/1651 |
| 9,120,228 | B2 | 9/2015 | Motoyoshi et al. | |
| 9,242,377 | B2 * | 1/2016 | Gomi | B25J 9/1638 |
| 9,327,358 | B2 * | 5/2016 | Nakahara | B23F 21/16 |

FOREIGN PATENT DOCUMENTS

| JP | 2012-171052 A | 9/2012 |
| JP | 2013-146827 A | 8/2013 |
| JP | 2017-056544 A | 3/2017 |
| JP | 2017056542 A | 3/2017 |

OTHER PUBLICATIONS

Notice_of_Reasons_for_Refusal_JP2020129358.

\* cited by examiner

*Primary Examiner* — Khoi H Tran
*Assistant Examiner* — Rodney P King
(74) *Attorney, Agent, or Firm* — Gang Yu (57) ABSTRACT

A control device controlling a robot including a robot arm, a drive section causing the robot arm to pivot around a pivot axis, a shaft that is provided at a position of the robot arm different from the pivot axis and that moves parallel to the pivot axis, and an angular velocity sensor that is provided in the robot arm and that detects angular velocity around an axis orthogonal to an axial direction of the pivot axis and parallel to a plane including the pivot axis and an axis of the shaft, the control device includes a processor that is configured to control the robot, wherein the processor is configured to perform feedback control on the drive section based on the angular velocity.

14 Claims, 7 Drawing Sheets

CONTROL DEVICE, ROBOT, AND ROBOT SYSTEM

The present application is based on, and claims priority from JP Application Serial Number 2018-101842, filed May 28, 2018, the disclosure of which is hereby incorporated by reference herein in its entirety.

BACKGROUND

1. Technical Field

The present disclosure relates to a control device, a robot, and a robot system.

2. Related Art

In the related art, a horizontal articulated robot (SCARA robot) has been known as a robot that conveys a component (e.g., see JP-A-2012-171052). A robot disclosed in JP-A-2012-171052 includes a base, a first arm that is coupled to the upper end portion of the base and that pivots with respect to the base about an axis along the vertical direction, a second arm that is coupled to the tip portion of the first arm and that pivots with respect to the first arm about an axis along the vertical direction, and a spline shaft that is provided at the tip portion of the second arm and that is displaced with respect to the second arm. An angular velocity sensor that measures the angular velocity of the second arm with respect to the base is installed within the second arm.

The operation of the robot configured as described above is controlled by a control device. The control device can compute the angular velocity of the first arm based on various signals input from the angular velocity sensor and the like installed within the second arm, and control a motor that causes the first arm to pivot so as to suppress vibration of the second arm (vibration in the horizontal direction).

JP-A-2012-171052 is an example of the related art.

Vibration generated in the second arm includes, in addition to the vibration in the horizontal direction, vibration around an axis (roll direction) along the longitudinal direction of the second arm. However, in the robot disclosed in JP-A-2012-171052, the vibration of the second arm in the horizontal direction is suppressed as described above, but suppression of the vibration around the axis along the longitudinal direction of the second arm is not considered.

SUMMARY

An advantage of some aspects of the present disclosure is to solve the problem described above and the present disclosure can be implemented as the following aspects.

A control device according to an aspect of the present disclosure is a control device controlling a robot including a robot arm, a drive section causing the robot arm to pivot around a pivot axis, and a shaft that is provided at a position of the robot arm different from the pivot axis and that moves parallel to the pivot axis, the control device including a control section controlling operation of the drive section, wherein the robot includes an angular velocity sensor that is provided in the robot arm and that detects angular velocity around an axis orthogonal to an axial direction of the pivot axis and parallel to a plane including the pivot axis and an axis of the shaft, and the control section performs feedback control on the drive section based on the angular velocity.

A robot according to an aspect of the present disclosure is controlled by the control device according to the aspect of the present disclosure.

A robot system according to an aspect of the present disclosure includes: the control device according to the aspect of the present disclosure; and a robot controlled by the control device.

DESCRIPTION OF EXEMPLARY EMBODIMENTS

Hereinafter, a control device, a robot, and a robot system according to the present disclosure will be described in detail based on a preferred embodiment shown in the accompanying drawings.

Figure 1:
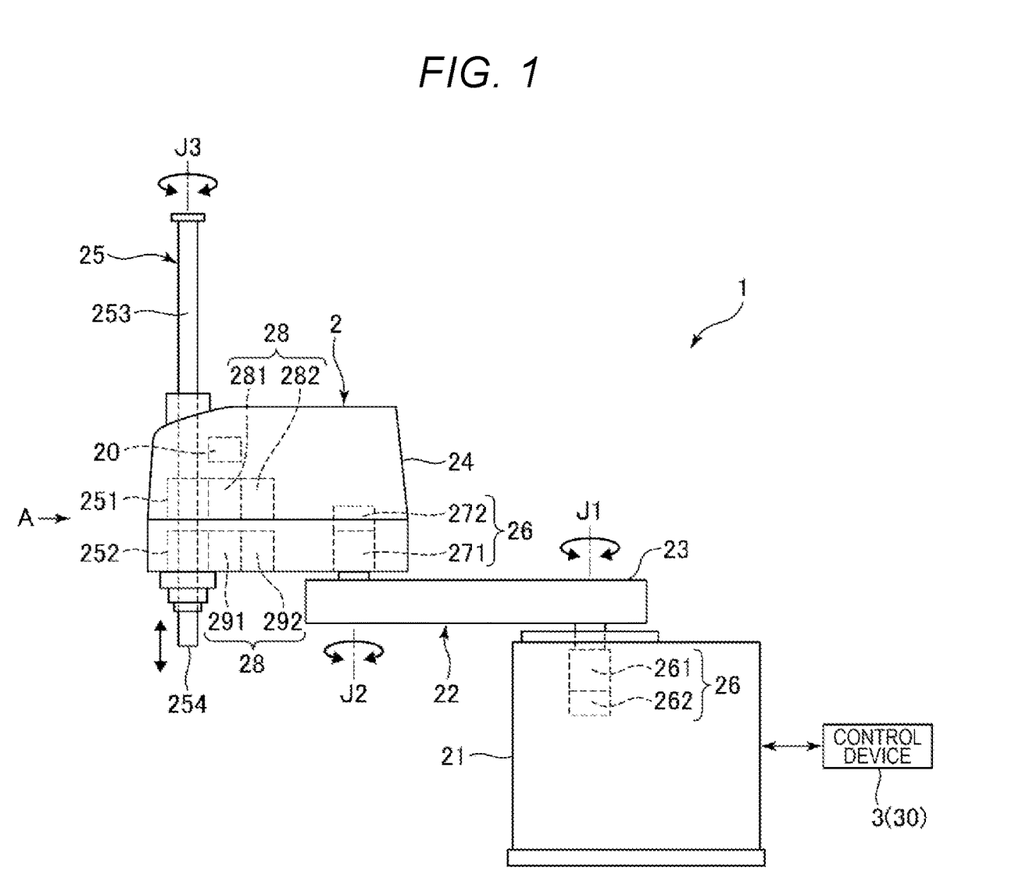
FIG. 1 is a diagram showing an overall configuration of a robot system according to an embodiment of the present disclosure.
Figure 2:
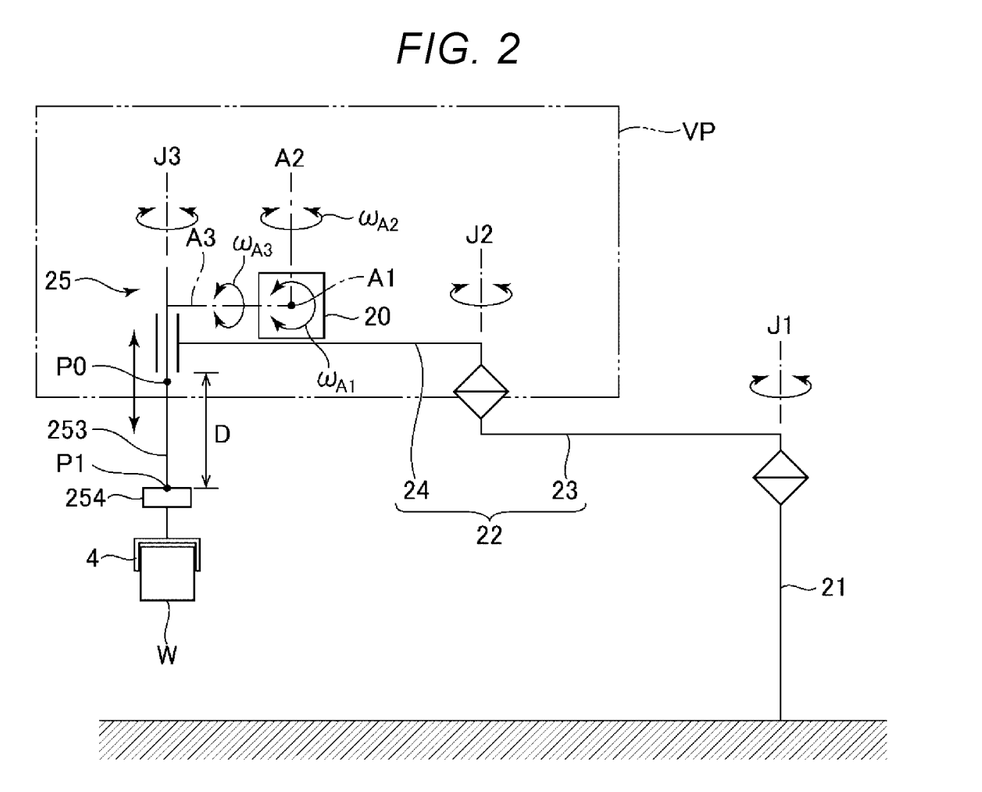
FIG. 2 is a schematic view of a robot in FIG. 1.
Figure 3:
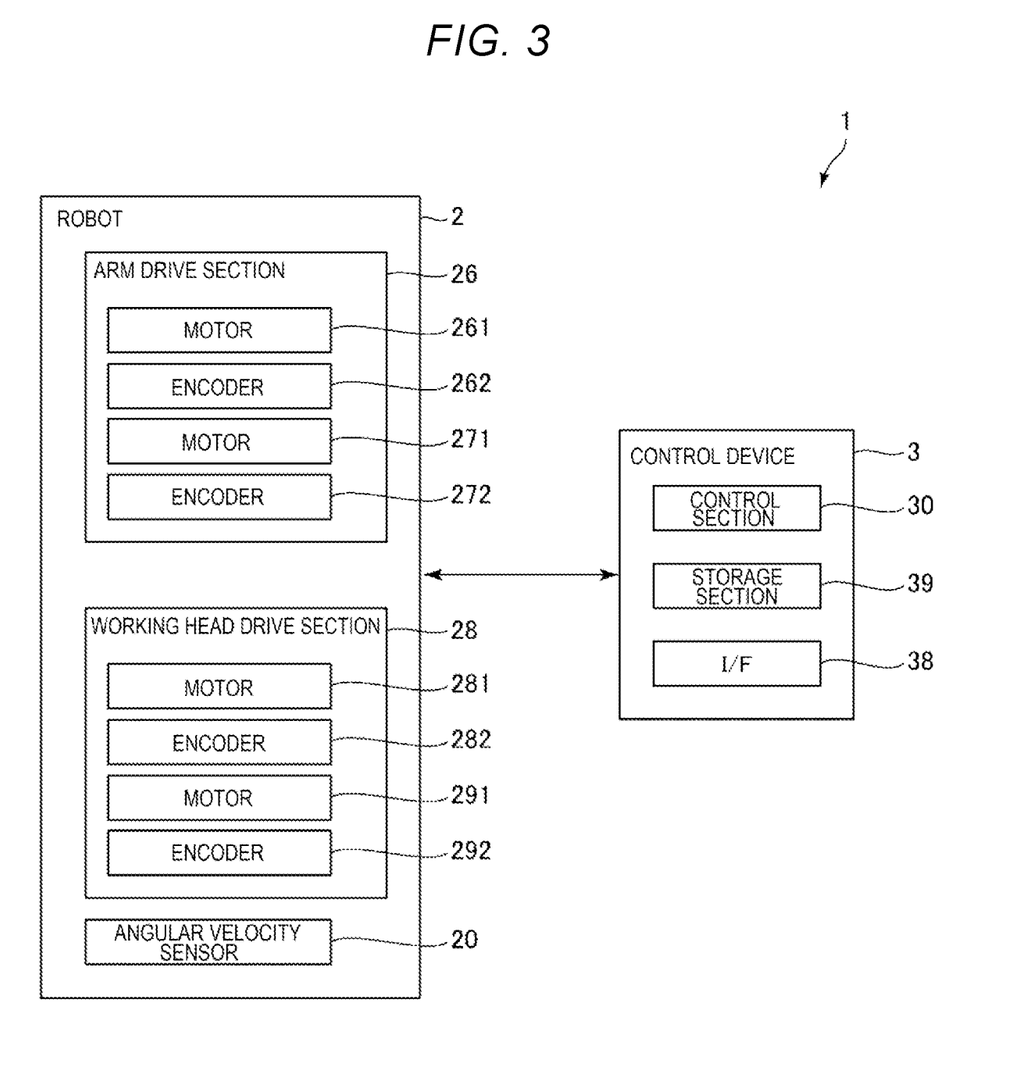
FIG. 3 is a block diagram showing a control system of the robot system shown in FIG. 1.
Figure 4:
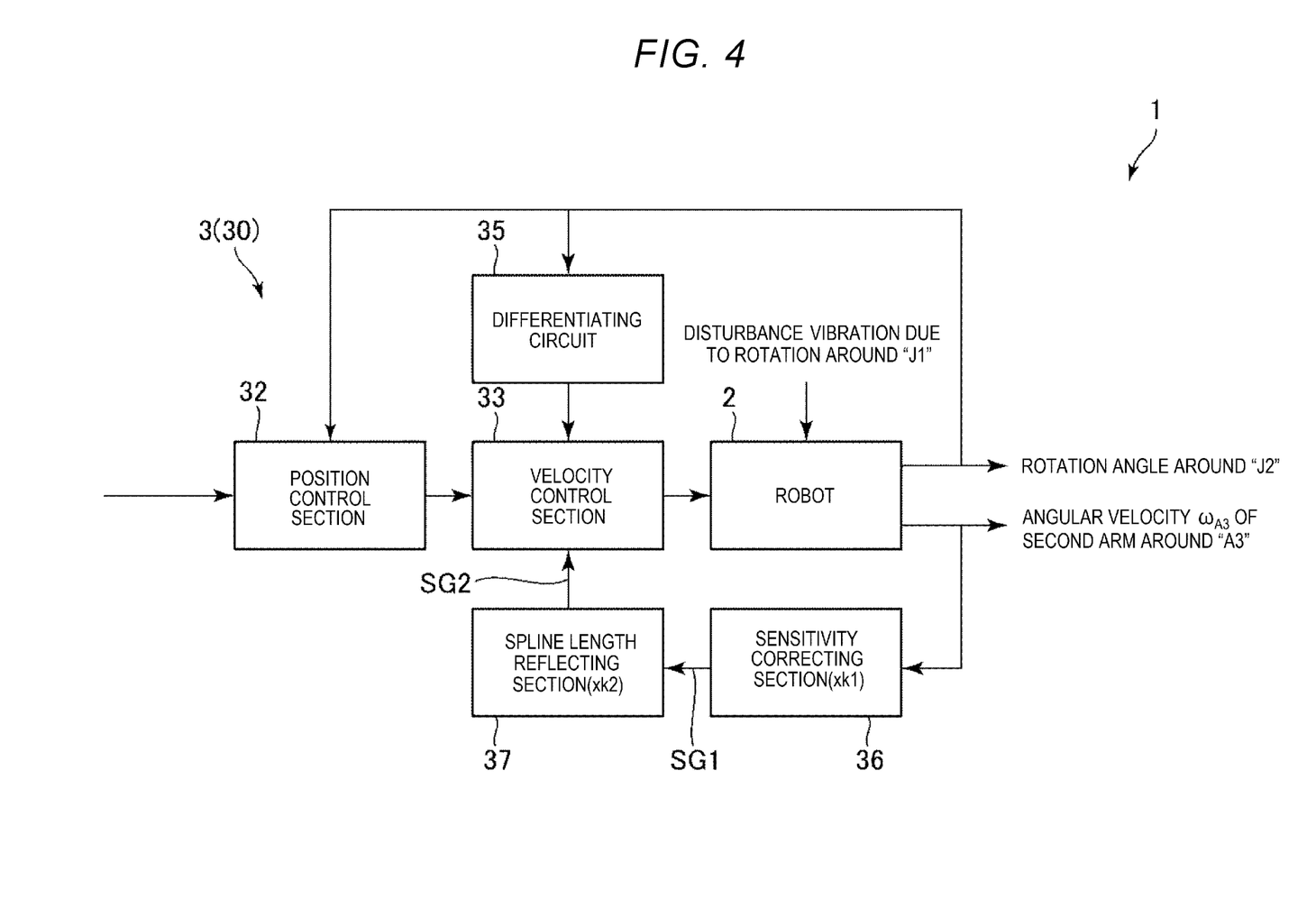
FIG. 4 is a block diagram showing a circuit system of the robot system shown in FIG. 1.
Figure 5:
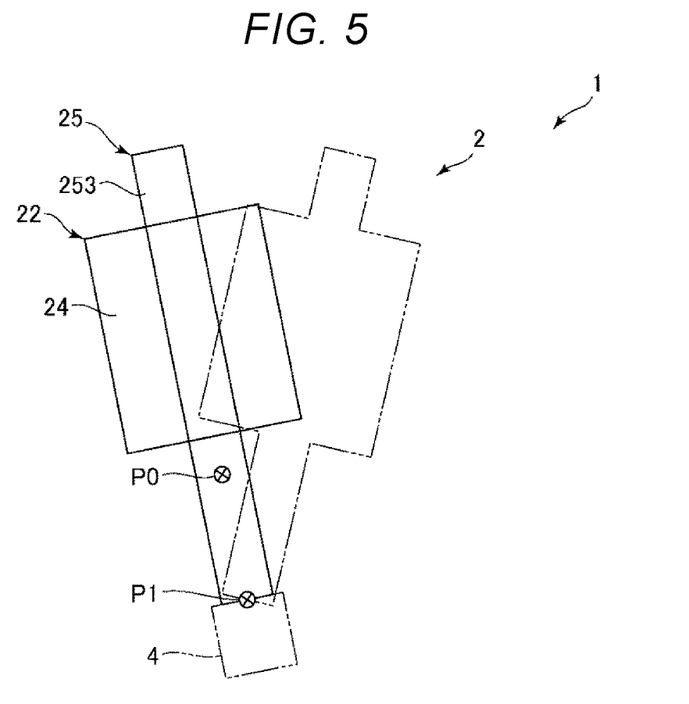
FIG. 5 is a diagram as viewed in the direction of an arrow A in FIG. 1.
Figure 6:
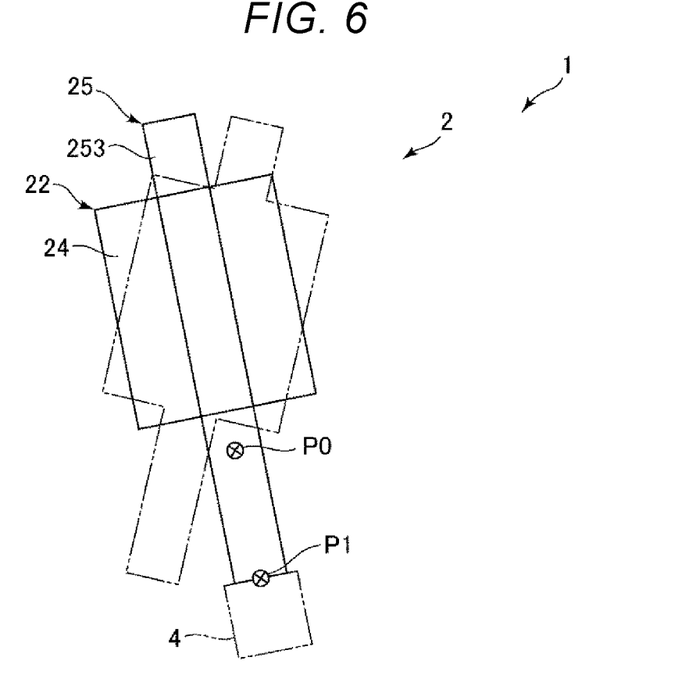
FIG. 6 is a diagram as viewed in the direction of the arrow A in FIG. 1.

FIG. 1 is a diagram showing an overall configuration of a robot system according to an embodiment of the present disclosure. FIG. 2 is a schematic view of a robot in FIG. 1. FIG. 3 is a block diagram showing a control system of the robot system shown in FIG. 1. FIG. 4 is a block diagram showing a circuit system of the robot system shown in FIG. 1. FIGS. 5 and 6 are diagrams as viewed in the direction of an arrow A in FIG. 1.

In FIG. 1, an end effector is not illustrated. Moreover, in FIG. 2, the end effector and an object are schematically shown. In the following, for convenience of description, the upper side in FIGS. 1, 2, 5, and 6 is defined as "up", and the lower side is defined as "down". Moreover, the up-down direction in FIGS. 1, 2, 5, and 6 is the vertical direction. In the present specification, the term "horizontal" includes, not only a case in which a line (including an axis) or surface is perfectly horizontal, but also a case in which the line or surface is inclined within ±50 with respect to the horizontal level. Similarly, in the present specification, the term "vertical" includes, not only a case in which a line (including an axis) or surface is perfectly vertical, but also a case in which the line or surface is inclined within ±50 with respect to the vertical. Moreover, in the present specification, the term "parallel" includes, not only a case in which two lines (including axes) or surfaces are perfectly parallel to each other, but also a case in which the two lines or surfaces are inclined within ±100. Moreover, in the present specification, the term "orthogonal" includes, not only a case in which two lines (including axes) or surfaces are perfectly orthogonal to each other, but also a case in which the two lines or surfaces are inclined within ±100°.

As shown in FIGS. 1 and 2, a control device 3 according to the present disclosure is a control device that controls a robot 2. The robot 2 includes an arm (robot arm) 22, an arm drive section (drive section) 26 causing the arm (robot arm) 22 to pivot around a pivot axis (a second axis J2), a spline shaft (shaft) 253 that is provided at a position of the arm (robot arm) 22 different from the pivot axis (the second axis J2), that moves parallel to the pivot axis (the second axis J2), and that is provided with an end effector 4 on one end side (lower side), and an angular velocity sensor 20 that is provided in the arm (robot arm) 22 and that detects angular velocity $\omega_{A3}$ around a third angular velocity detection axis A3 (axis) orthogonal to the axial direction of the pivot axis (the second axis J2) and parallel to a plane (a virtual plane VP) including the pivot axis (the second axis J2) and an axis (a third axis J3) of the spline shaft (shaft) 253. The control device 3 includes a control section 30 controlling the operation of the arm drive section (drive section) 26. The control section 30 performs feedback control on the arm drive section (drive section) 26 based on the angular velocity $\omega_{A3}$ when the arm (robot arm) 22 pivots around the pivot axis (the second axis J2). The control section 30 can suppress vibration generated in the spline shaft (shaft) 253 at a control point P1 on the end effector 4 side to be less than vibration on the side opposite to the end effector 4 by feedback control.

According to the present disclosure, after the arm 22 pivots around the second axis J2 and stops, the position of the control point P1 can be maintained as constant as possible as will be described later. With this configuration, when an object W is grasped by the end effector 4, the grasping can be stably performed.

The robot 2 according to the present disclosure is controlled by the control device 3. With this configuration, the robot 2 exhibiting the advantages of the control device 3 described above can be obtained.

A robot system 1 according to the present disclosure includes the control device 3 and the robot 2 controlled by the control device 3. With this configuration, the robot system 1 having the advantages of the control device 3 described above can be obtained.

The robot system 1 shown in FIG. 1 includes the robot 2 and the control device 3 controlling the robot 2. The uses of the robot system 1 are not particularly limited, and the robot system 1 can be used in, for example, each of jobs such as holding, conveyance, assembly, and inspection of a work (object) such as an electronic component and an electronic device. The robot 2 is a horizontal articulated robot (SCARA robot) and includes a base 21, the arm 22 provided to the base 21 and movable with respect to the base 21, a working head 25 provided to the arm 22, and the angular velocity sensor 20 provided in the arm 22. Moreover, the robot 2 includes the arm drive section 26 driving the arm 22 and a working head drive section 28 driving the working head 25.

The base 21 is fixed to, for example, a floor surface (not shown) with a volt or the like. The arm 22 includes a first arm 23 that is provided (coupled) to the base 21 and that is pivotable around a first axis J1 with respect to the base 21, and a second arm 24 that is provided at (coupled to) the tip portion of the first arm 23 and that is pivotable with respect to the first arm 23 around the second axis J2 parallel to the first axis J1.

A motor (first motor) 261 causing the first arm 23 to pivot with respect to the base 21 around the first axis (first pivot axis) J1 serving as the pivot axis of the first arm 23 is provided within the base 21. The motor 261 is provided with an encoder 262 (position detecting section) detecting the rotation amount of the motor 261, and thus the pivot angle of the first arm 23 with respect to the base 21 can be detected based on an output from the encoder 262. A motor (second motor) 271 causing the second arm 24 to pivot with respect to the first arm 23 around the second axis (second pivot axis) J2 serving as the pivot axis of the second arm 24 is provided within the second arm 24. The motor 271 is provided with an encoder 272 (position detecting section) detecting the rotation amount of the motor 271, and thus the pivot angle of the second arm 24 with respect to the first arm 23 can be detected based on an output from the encoder 272. As shown in FIG. 3, the arm drive section 26 is configured to include the motor 261, the encoder 262, the motor 271, and encoder 272.

The working head 25 is provided at the tip portion of the second arm 24, that is, at a position of the second arm 24 (the arm 22) different from the second axis J2. The working head 25 includes a spline nut 251, a ball screw nut 252, and the spline shaft 253. The spline nut 251 and the ball screw nut 252 are coaxially disposed at the tip portion of the second arm 24. The spline shaft 253 is inserted through the spline nut 251 and the ball screw nut 252. The spline shaft 253 can pivot with respect to the second arm 24 around the third axis J3, which is the central axis of the spline shaft 253, and can move (reciprocate) in a direction (direction parallel to the third axis J3) along the third axis J3. The first axis J1, the second axis J2, and the third axis J3 are parallel to each other and along the vertical direction.

A motor 281 causing the spline nut 251 to rotate to rotate the spline shaft 253 around the third axis J3 is provided within the second arm 24. The motor 281 is provided with an encoder 282 (position detecting section) detecting the rotation amount of the motor 281, and thus the rotation amount of the spline shaft 253 with respect to the second arm 24 can be detected based on an output from the encoder 282. A motor 291 causing the ball screw nut 252 to rotate to move the spline shaft 253 in the direction along the third axis J3 is provided within the second arm 24. The motor 291 is provided with an encoder 292 (position detecting section) detecting the rotation amount of the motor 291, and thus the moving amount of the spline shaft 253 with respect to the second arm 24 can be detected based on an output from the encoder 292. As shown in FIG. 3, the working head drive section 28 is configured to include the motor 281, the encoder 282, the motor 291, and the encoder 292.

As shown in FIGS. 1 and 2, a payload 254 for attaching the end effector 4 is provided at the tip portion (lower end portion) of the spline shaft 253. The end effector 4 attached to the payload 254 is not particularly limited, and examples of the end effector 4 include, for example, a hand to hold (grasp or suction) the object W and a working tool to process the object W.

The angular velocity sensor 20 is provided within the second arm 24. Especially in the embodiment, the angular velocity sensor 20 is provided at the tip portion (in the vicinity of the spline shaft 253) of the second arm 24.

As shown in FIG. 2, the angular velocity sensor 20 can detect angular velocity around three axes in the second arm 24 when the arm 22 (the first arm 23) pivots around the first axis J1 in a state in which the second arm 24 pivots around the second axis J2 or the pivoting of the second arm 24 is stopped. In the following, "angular velocity in pivoting of the second arm 24 around the second axis J2" is represented. The first axis of the three axes is a first angular velocity detection axis A1 in FIG. 2; the second axis is a second angular velocity detection axis A2; and the third axis is the third angular velocity detection axis A3. The angular velocity sensor 20 is preferably configured of, for example, a gyro sensor.

The first angular velocity detection axis A1 is an axis orthogonal to the plane (the virtual plane VP) including (passing through) the second axis J2 and the third axis J3, that is, to the paper surface of FIG. 2. The angular velocity around the first angular velocity detection axis A1 (pitch direction) may be referred to as "angular velocity (first angular velocity) A1".

The second angular velocity detection axis A2 is an axis orthogonal to the first angular velocity detection axis A1, that is, parallel to the axial direction of the second axis J2. The angular velocity around the second angular velocity detection axis A2 (yaw direction) may be referred to as "angular velocity (second angular velocity) $\omega_{A2}$".

The third angular velocity detection axis A3 is an axis orthogonal to the first angular velocity detection axis A1 and the second angular velocity detection axis A2, that is, orthogonal to the axial direction of the second axis J2 and parallel to the virtual plane VP. The angular velocity around the third angular velocity detection axis A3 (roll direction) may be referred to as the "angular velocity (third angular velocity) $\omega_{A3}$".

As described above, the angular velocity sensor 20 can detect the angular velocity $\omega_{A1}$ around the first angular velocity detection axis A1 orthogonal to the virtual plane VP. With this configuration, for example information of the angular velocity $\omega_{A1}$ can be used for vibration suppression control of the spline shaft 253 in the up-down direction (vertical direction).

The angular velocity sensor 20 can also detect the angular velocity $\omega_{A2}$ around the second angular velocity detection axis A2 (axis) parallel to the second axis J2 (pivot axis). With this configuration, for example information of the angular velocity $\omega_{A2}$ can be used for vibration suppression control of the spline shaft 253 in the horizontal direction.

The angular velocity sensor 20 can also detect the angular velocity $\omega_{A3}$ around the third angular velocity detection axis A3 parallel to the longitudinal direction of the second arm 24. The angular velocity $\omega_{A3}$ is used for vibration suppression control of the spline shaft 253 around the third angular velocity detection axis A3. This control will be described later.

The angular velocity sensor 20 is not particularly limited as long as angular velocity can be detected. For example, an angular velocity sensor that detects angular velocity from an electric charge generated by deformation of a piezoelectric body, an angular velocity sensor that detects angular velocity from a change in electrostatic capacitance, and the like can be used. In the embodiment, a quartz crystal vibrator is used as the angular velocity sensor 20. The quartz crystal vibrator includes a vibrating arm and is configured such that in a state in which the vibrating arm is vibrated in a drive vibration mode, when angular velocity around any detection axis of the first angular velocity detection axis A1, the second angular velocity detection axis A2, and the third angular velocity detection axis A3 is applied, a detection vibration mode is excited in the vibrating arm by a Coriolis force and a detection signal according to the detection vibration mode is output. Therefore, the angular velocity around each of the detection axes can be detected based on the detection signal output from the quartz crystal vibrator.

As shown in FIG. 3, the control device 3 is electrically coupled to the arm drive section 26, the working head drive section 28, and the angular velocity sensor 20 of the robot 2, and includes the control section 30 controlling the operation of each of these portions. The robot 2 and the control device 3 are electrically coupled through a cable. However, the coupling of the robot 2 and the control device 3 is not limited to the wired system, and for example, the robot 2 and the control device 3 may be coupled using a wireless system without the cable. Moreover, a portion or the whole of the control device 3 may be incorporated into the robot 2.

The control device 3 (the control section 30) can be configured of, for example, a computer (PC) or the like into which a central processing unit (CPU) as one example of a processor is incorporated. With this configuration, the control device 3 can control each portion of the robot 2.

Moreover, as shown in FIG. 3, the control device 3 includes a storage section 39 storing various kinds of information (various conditions), and an input section 38 for inputting various kinds of information (various conditions).

The storage section 39 can store, for example, a program to cause motion of the robot 2, information input via the input section 38, and the like.

The input section 38 can receive information necessary for motion of the robot 2. The input section 38 is not particularly limited, and can be configured of, for example, a keyboard, a touch panel, or the like.

Next, the vibration suppression control of the spline shaft 253 around the third angular velocity detection axis A3 will be described.

When the second arm 24 pivots by a predetermined angle around the second axis J2 and stops, the second arm 24 vibrates around the third angular velocity detection axis A3, that is, in the roll direction. In addition, the spline shaft 253 provided at the tip portion of the second arm 24 also vibrates around the third angular velocity detection axis A3 together with the second arm 24. In the angular velocity sensor 20, the angular velocity $\omega_{A3}$ equivalent to the vibration around the third angular velocity detection axis A3 can be detected.

As described above, the spline shaft 253 can move along the direction of the third axis J3. As shown in FIG. 2, a reference point P0 in movement in the direction of the third axis J3 is set on the spline shaft 253. Although the reference point P0 can be set to any point on the spline shaft 253, the reference point P0 is preferably set at, for example, the lower end of the spline shaft 253 when the spline shaft 253 is located at an upward limit position.

Moreover, the control point P1 on the end effector 4 side is set on the spline shaft 253. The control point P1 is a vibration-control target point at which the influence of vibration of the spline shaft 253 is desired to be minimized as much as possible (the vibration is desired to be most suppressed) when the spline shaft 253 vibrates around the third angular velocity detection axis A3. Although the control point P1 can be set to any point on the spline shaft 253 different from the reference point P0, the control point P1 is preferably set at, for example, the lower end of the spline shaft 253 irrespective of the position of the spline shaft 253 in the direction of the third axis J3.

The spline shaft 253 is configured such that a distance (hereinafter the distance is referred to as "spline length") D between the reference point P0 and the control point P1 changes according to the moving amount in movement in the direction of the third axis J3. For example, the spline length D obtained when the spline shaft 253 is located at the upward limit position is minimum, that is, zero. Moreover, the spline length D obtained when the spline shaft 253 is located at a downward limit position is maximum.

When the second arm 24 vibrates around the third angular velocity detection axis A3, the amplitude of vibration (amount of displacement) at the control point P1 increases as the vibration increases, as a result of which the position of the control point P1 may not be determined (see FIG. 6). For example, even when it is tried in this state to grasp the object W by the end effector 4, it may be difficult to perform the grasping.

Therefore, the control device 3 is configured such that the control device 3 suppresses the vibration of the spline shaft 253 around the third angular velocity detection axis A3 and thus can control, with this suppression, the position of the control point P1 so as to be maintained as constant as possible.

As the configuration described above, the control section 30 of the control device 3 includes a position control section 32, a velocity control section 33, and a differentiating circuit 35 as shown in FIG. 4.

The position control section 32 is a portion that generates a velocity command to the motor 271 to cause the second arm 24 to pivot around the second axis J2 based on, for example, a position command previously stored in the storage section 39.

The velocity control section 33 is a portion that generates a current command to drive the motor 271 based on the velocity command generated by the position control section 32.

The differentiating circuit 35 is a portion that differentiates the pivot angle of the second arm 24 around J2, which is obtained based on the output from the encoder 272. A command (angular velocity command) generated by the differentiation is input to the velocity control section 33 and superimposed on the current command to drive the motor 271.

As shown in FIG. 4, disturbance vibration due to the rotation (pivoting) of the first arm 23 around the first axis J1 may enter the robot 2.

Moreover, the control section 30 includes a sensitivity correcting section 36 and a spline length reflecting section 37.

The sensitivity correcting section 36 is a portion that corrects the angular velocity $\omega_{A3}$ around the third angular velocity detection axis A3 output from the angular velocity sensor 20. As this correction, the angular velocity $\omega_{A3}$ is multiplied by a coefficient (first coefficient) k1 in the embodiment. The coefficient k1 is any numerical value exceeding 0. Then, a first control amount (command) SG1 obtained by multiplying the angular velocity $\omega_{A3}$ by the coefficient k1 is input to the spline length reflecting section 37.

For example, when 0<k1<1, the angular velocity $\omega_{A3}$ is reduced in the sensitivity correcting section 36. In contrast to this, when the correction in the sensitivity correcting section 36 is omitted, the angular velocity $\omega_{A3}$ is input without changes in magnitude, that is, without being reduced to the velocity control section 33, as a result of which it may be difficult for the second arm 24 to smoothly pivot around the second axis J2.

The spline length reflecting section 37 is a portion that reflects the amount of influence of the spline length D on vibration suppression control of the spline shaft 253 around the third angular velocity detection axis A3. The influence of the spline length D on the vibration suppression control increases as the spline length D increases. Therefore, it is preferable to consider the size of the spline length D, and the control section 30 includes the spline length reflecting section 37. The spline length reflecting section 37 multiplies the first control amount SG1 by a coefficient k2 according to the size of the spline length D. Then, a second control amount (command) SG2 obtained by multiplying the first control amount SG1 by the coefficient k2 is input to the velocity control section 33 and superimposed on the current command to drive the motor 271. The coefficient k2 is obtained from, for example, a calibration curve showing the relationship between the spline length D and the vibration of the spline shaft 253 around the third angular velocity detection axis A3. The calibration curve is previously obtained by, for example, a simulation or experiment and stored in the storage section 39.

By the feedback control described above, the motor 271 is brought into a drive state matched to the position command and the velocity command. The drive state is a state in which the vibration of the spline shaft 253 around the third angular velocity detection axis A3 can be suppressed. With this configuration, the amplitude of vibration at the control point P1 is canceled out, and the position of the control point P1 is determined.

As described above, the arm (robot arm) 22 includes the first arm 23 coupled to the base 21, and the second arm 24 coupled to the first arm 23. The arm drive section (drive section) 26 includes the motor (first motor) 261 causing the first arm 23 to pivot around the first axis (first pivot axis) J1 serving as the pivot axis of the first arm 23, and the motor (second motor) 271 causing the second arm 24 to pivot around the second axis (second pivot axis) J2 serving as the pivot axis of the second arm 24.

Moreover, as described above, the control section 30 can perform feedback control on the motor (second motor) 271 of the arm drive section 26 based on the angular velocity $\omega_{A3}$ when the second arm 24 pivots around the second axis J2. In addition, as shown in FIG. 5, the control section 30 can suppress, by the feedback control, the vibration (amplitude of vibration) generated in the spline shaft 253 at the control point P1 on the end effector 4 side to less than the vibration (amplitude of vibration) on the side opposite to the end effector 4, that is, at the reference point P0.

With this configuration, as shown in FIG. 5, the position of the control point P1 is maintained constant, and therefore, when the object W is grasped by the end effector 4, the grasping can be stably performed.

Although the position of the control point P1 is maintained constant in the state shown in FIG. 5, the position of the control point P1 may be displaced slightly more than that in the state shown in FIG. 5 (to such an extent that does not disturb the grasping of the object W) depending on, for example, various conditions such as the arrangement position of the angular velocity sensor 20.

When the feedback control is omitted, the position of the control point P1 is brought into the state shown in FIG. 6. In the state shown in FIG. 6, the position of the control point P1 is remarkably displaced, and even when it is tried in this state to grasp the object W by the end effector 4, it may be difficult to perform the grasping.

The feedback control is suitable for a horizontal articulated robot (SCARA robot) performing a compliance pass (CP) motion such as the robot 2.

As described above, the reference point P0 in movement in the direction of the third axis J3 parallel to the second axis J2 (pivot axis) is set on the spline shaft (shaft) 253. The spline shaft (shaft) 253 is configured such that the spline length (distance) D between the reference point P0 and the control point P1 changes according to the moving amount in movement in the direction of the third axis J3 parallel to the second axis J2 (pivot axis) (see FIG. 2). The control section 30 uses the information on the spline length (distance) D for feedback control.

The spline length D affects the vibration suppression control of the spline shaft 253 around the third angular velocity detection axis A3 as the spline length D increases. Therefore, by the use of the information on the spline length D for feedback control, the vibration suppression control is made in consideration of the size of the spline length D. This contributes to making the position of the control point P1 constant.

The information on the spline length (distance) D can be input via the input section 38. That is, the control device 3 includes the input section 38 for inputting the information on the spline length (distance) D. With this configuration, when the information on the spline length D is desired to be changed, the change can be rapidly made. With this change, the coefficient k2 is also changed.

Figure 7:
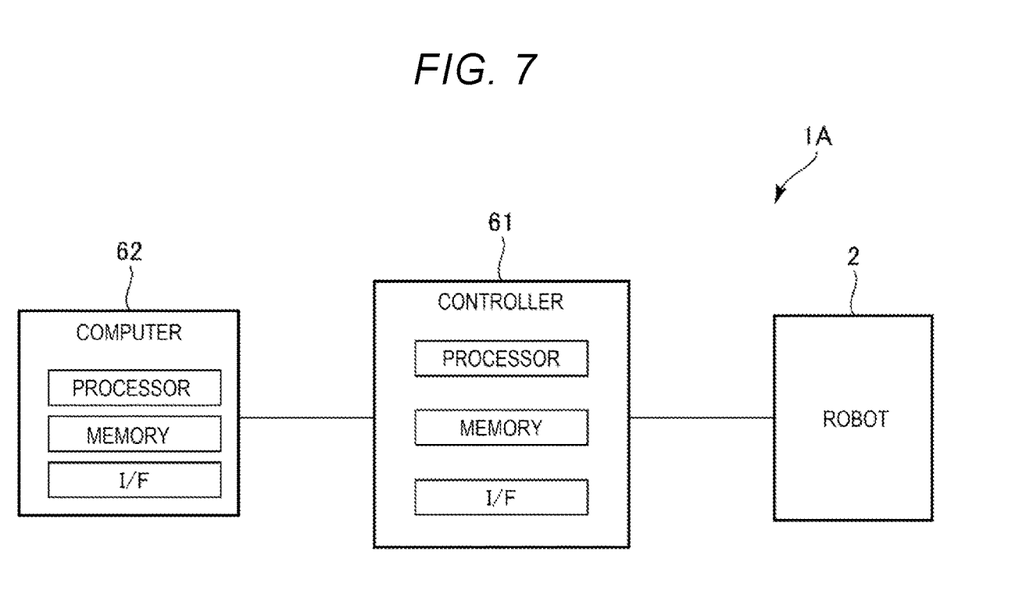
FIG. 7 is a block diagram for explaining the embodiment focusing on hardware (processor).

FIG. 7 is a block diagram for explaining the embodiment focusing on hardware (processor). FIG. 7 shows an overall configuration of a robot system 1A in which the robot 2, a controller 61, and a computer 62 are coupled to one another. The control of the robot 2 may be executed by a processor present in the controller 61 by reading a command present in a memory, or may be executed by a processor present in the computer 62 by reading a command present in a memory via the controller 61. Hence, any one or both of the controller 61 and the computer 62 can be considered as "control device".

Figure 8:
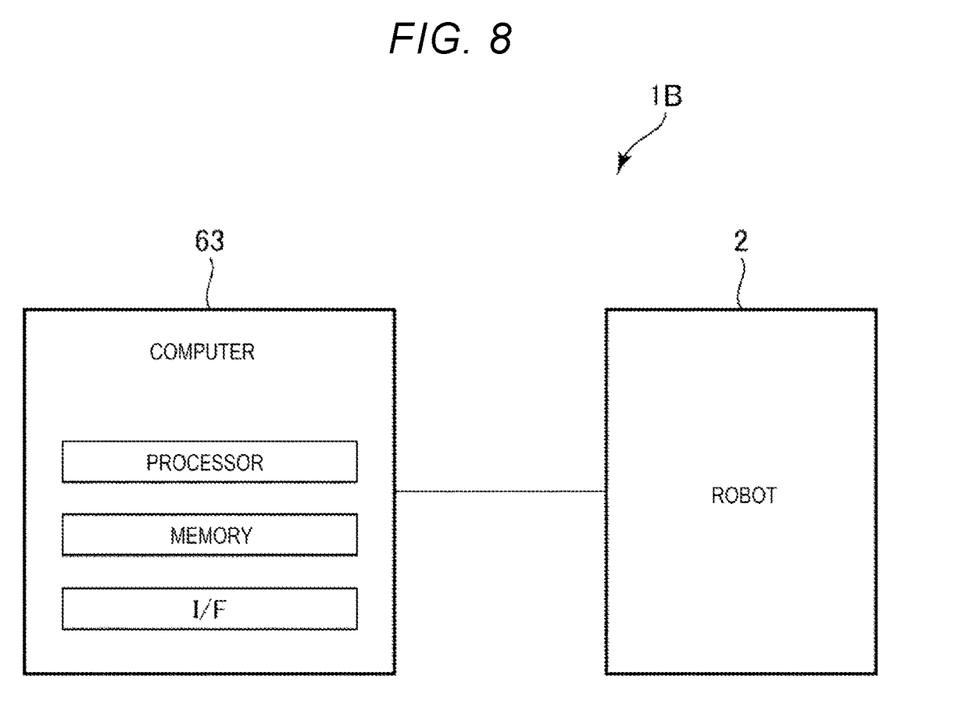
FIG. 8 is a block diagram showing Example 1 (Modified Example 1) of a robot system according to the present disclosure.

FIG. 8 is a block diagram showing Example 1 (Modified Example 1) of a robot system according to the present disclosure. FIG. 8 shows an overall configuration of a robot system 1B in which a computer 63 is directly coupled to the robot 2. The control of the robot 2 is directly executed by a processor present in the computer 63 by reading a command present in a memory. Hence, the computer 63 can be considered as "control device".

Figure 9:
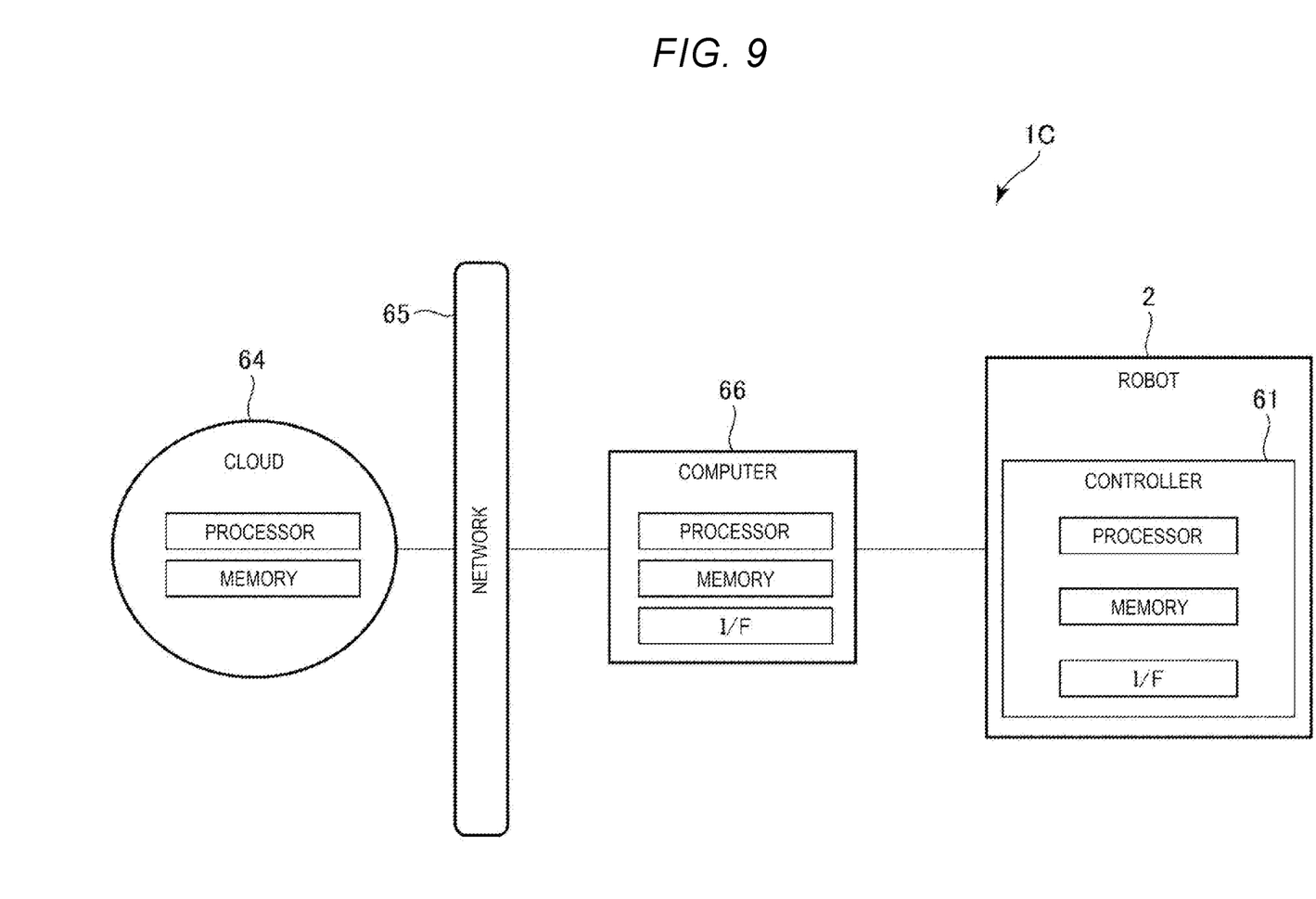
FIG. 9 is a block diagram showing Example 2 (Modified Example 2) of a robot system according to the present disclosure.

FIG. 9 is a block diagram showing Example 2 (Modified Example 2) of a robot system according to the present disclosure. FIG. 9 shows an overall configuration of a robot system 1C in which the robot 2 into which the controller 61 is incorporated and a computer 66 are coupled and the computer 66 is coupled to a cloud 64 via a network 65 such as LAN. The control of the robot 2 may be executed by a processor present in the computer 66 by reading a command present in a memory, or may be executed by a processor present on the cloud 64 by reading a command present in a memory via the computer 66. Hence, any one or two or the three (whole) of the controller 61, the computer 66, and the cloud 64 can be considered as "control device".

Although the control device, the robot, and the robot system according to the present disclosure have been described above based on the illustrated embodiment, the present disclosure is not limited to the embodiment. Each of the portions constituting the control device, the robot, and the robot system can be replaced with a portion having any configuration that may provide a similar function. Moreover, any configuration may be added.

Although the fixing place of the base of the robot is, for example, a floor in an installation space in the embodiment, the fixing place is not limited to the floor in the present disclosure. Examples of the fixing place include, for example, a ceiling, a wall, a work table, and the ground in addition to the floor. Moreover, the base itself may be movable. Moreover, the robot may be installed within a cell in the present disclosure. In this case, examples of the fixing place of the base of the robot include, for example, a floor portion, a ceiling portion, a wall portion, and a work table of the cell.

Although a first surface that is a plane (surface) to which the robot (base) is fixed is a plane (surface) parallel to a horizontal plane in the embodiment, the first surface is not limited to the plane (surface) in the present disclosure. For example, the first surface may be a plane (surface) inclined with respect to a horizontal plane or a vertical plane, and may be a plane (surface) parallel to the vertical plane. That is, the first to third axes may be inclined with respect to the vertical direction.

Although the number of pivot axes of the robot arm is two in the embodiment, the number of pivot axes of the robot arm is not limited to two in the present disclosure. The number of pivot axes of the robot arm may be one or three or more. That is, although the number of arms is two in the embodiment, the number of arms is not limited to two in the present disclosure. The number of arms may be, for example, one or three or more. Moreover, the processor may be configured of one device, or may be configured of a plurality of devices. That is, the processor may be separated into a plurality of unit processors.

What is claimed is:

1. A control device controlling a robot including a robot arm that includes a first arm coupled to a base and a second arm coupled to the first arm, a drive section causing the robot arm to pivot around a pivot axis, a shaft that is provided at a tip portion of the second arm different from the pivot axis and that moves parallel to the pivot axis, and an angular velocity sensor that is provided in the vicinity of the shaft at the tip portion of the second arm and that detects a first angular velocity of the second arm around a first axis orthogonal to an axial direction of the pivot axis and parallel to a plane including the pivot axis and an axis of the shaft, a second angular velocity of the second arm around a second axis parallel to the axial direction of the pivot axis, and a third angular velocity of the second arm around a third axis parallel to the longitudinal direction of the second arm and orthogonal to the first axis and the second axis, the control device comprising:
a processor that is configured to execute computer-executable instructions so as to control the robot,
wherein the processor is configured to perform feedback control on the drive section based on the third angular velocity.

2. The control device according to claim 1, wherein
the drive section includes
a first motor causing the first arm to pivot around a first pivot axis serving as the pivot axis and
a second motor causing the second arm to pivot around a second pivot axis serving as the pivot axis, and
the processor is configured to perform the feedback control on the second motor based on the third angular velocity.

3. The control device according to claim 1, wherein
a reference point in movement parallel to the pivot axis is set on the shaft,
the shaft is configured such that a distance between the reference point and a control point changes according to a moving amount in movement parallel to the pivot axis, and
the processor is configured to use information on the distance for the feedback control.

4. The control device according to claim 3, wherein the processor is configured to input the information on the distance.

5. A robot comprising:

a robot arm that includes a first arm coupled to a base and a second arm coupled to the first arm, a drive section causing the second arm to pivot around a pivot axis, a shaft that is provided at a tip portion of the second arm different from the pivot axis and that moves parallel to the pivot axis, an angular velocity sensor that is provided in the vicinity of the shaft at the tip portion of the second arm and that detects a first angular velocity of the second arm around a first axis orthogonal to an axial direction of the pivot axis and parallel to a plane including the pivot axis and an axis of the shaft, a second angular velocity of the second arm around a second axis parallel to the axial direction of the pivot axis, and a third angular velocity of the second arm around a third axis parallel to the longitudinal direction of the second arm and orthogonal to the first axis and the second axis, and a processor that is configured to execute computer-executable instructions so as to control the robot, wherein the processor is configured to perform feedback control on the drive section based on the third angular velocity.

6. The robot according to claim 5, wherein the drive section includes a first motor causing the first arm to pivot around a first pivot axis serving as the pivot axis and a second motor causing the second arm to pivot around a second pivot axis serving as the pivot axis, and the processor is configured to perform the feedback control on the second motor based on the third angular velocity.

7. The robot according to claim 5, wherein a reference point in movement parallel to the pivot axis is set on the shaft, the shaft is configured such that a distance between the reference point and a control point changes according to a moving amount in movement parallel to the pivot axis, and the processor is configured to use information on the distance for the feedback control.

8. The control device according to claim 7, wherein the processor is configured to input the information on the distance.

9. A robot system comprising:

a robot includes a robot arm that includes a first arm coupled to a base and a second arm coupled to the first arm, a drive section causing the robot arm to pivot around a pivot axis, a shaft that is provided at a tip portion of the second arm different from the pivot axis and that moves parallel to the pivot axis, and an angular velocity sensor that is provided in the vicinity of the shaft at the tip portion of the second arm and that detects a first angular velocity of the second arm around a first axis orthogonal to an axial direction of the pivot axis and parallel to a plane including the pivot axis and an axis of the shaft; a second angular velocity of the second arm around a second axis parallel to the axial direction of the pivot axis, and a third angular velocity of the second arm around a third axis parallel to the longitudinal direction of the second arm and orthogonal to the first axis and the second axis, and a control device includes a processor that is configured to execute computer-executable instructions so as to control the robot, wherein the processor is configured to perform feedback control on the drive section based on the third angular velocity.

10. The robot system according to claim 9, wherein the drive section includes a first motor causing the first arm to pivot around a first pivot axis serving as the pivot axis and a second motor causing the second arm to pivot around a second pivot axis serving as the pivot axis, and the processor is configured to perform the feedback control on the second motor based on the third angular velocity.

11. The robot system according to claim 10, wherein a reference point in movement parallel to the pivot axis is set on the shaft, the shaft is configured such that a distance between the reference point and a control point changes according to a moving amount in movement parallel to the pivot axis, and the processor is configured to use information on the distance for the feedback control.

12. The robot system according to claim 11, wherein the processor is configured to input the information on the distance.

13. The robot system according to claim 9, wherein a reference point in movement parallel to the pivot axis is set on the shaft, the shaft is configured such that a distance between the reference point and a control point changes according to a moving amount in movement parallel to the pivot axis, and the processor is configured to use information on the distance for the feedback control.

14. The robot system according to claim 13, wherein the processor is configured to input the information on the distance.

* * * * *